United States Patent
Chen et al.

(10) Patent No.: US 9,779,698 B2
(45) Date of Patent: Oct. 3, 2017

(54) INFORMATION PROCESSING METHOD AND ELECTRONIC DEVICE

(71) Applicant: Lenovo (Beijing) Co., Ltd., Beijing (CN)

(72) Inventors: Chen Chen, Beijing (CN); Houkai Song, Beijing (CN); Shoupeng Zhang, Beijing (CN)

(73) Assignee: LENOVO (BEIJING) CO., LTD., Haidian District, Beijing (CN)

( * ) Notice: Subject to any disclaimer, the term of this patent is extended or adjusted under 35 U.S.C. 154(b) by 189 days.

(21) Appl. No.: 14/658,818

(22) Filed: Mar. 16, 2015

(65) Prior Publication Data

US 2016/0125848 A1    May 5, 2016

(30) Foreign Application Priority Data

Nov. 3, 2014   (CN) .......................... 2014 1 0608803

(51) Int. Cl.
   - G09G 5/30   (2006.01)
   - G09G 5/37   (2006.01)
   - G06T 11/60  (2006.01)

(52) U.S. Cl.
   CPC ............... *G09G 5/37* (2013.01); *G06T 11/60* (2013.01); *G09G 5/30* (2013.01)

(58) Field of Classification Search
   None
   See application file for complete search history.

(56) References Cited

U.S. PATENT DOCUMENTS

| | | | |
|---|---|---|---|
| 2002/0171665 A1* | 11/2002 | Ramani | G06T 11/40 345/611 |
| 2004/0042656 A1* | 3/2004 | Timor | G06K 9/3233 382/171 |
| 2012/0075440 A1* | 3/2012 | Ahuja | G06T 7/0081 348/61 |
| 2014/0002506 A1* | 1/2014 | Li | G06F 8/38 345/666 |
| 2015/0234863 A1* | 8/2015 | Lilje | G06F 17/30259 382/103 |

FOREIGN PATENT DOCUMENTS

| | | |
|---|---|---|
| CN | 103324388 A | 9/2013 |
| CN | 103914689 A | 7/2014 |

OTHER PUBLICATIONS

Office Action, and English language translation thereof, in corresponding Chinese Application No. 201410608803.5, dated Mar. 7, 2017, 12 pages.

\* cited by examiner

*Primary Examiner* — James A Thompson
(74) *Attorney, Agent, or Firm* — Brinks Gilson & Lione; G. Peter Nichols (57) ABSTRACT

An information processing method and an electronic device are described. The information processing method is applied to an electronic device having a display unit. The method includes obtaining a parameter value of a pixel of a source icon on the display unit; analyzing an energy distribution of the source icon based on the parameter value, and determining a core area of the source icon; extracting the core area and conducting image processing of the core area to generate a substitution icon of the source icon for displaying, the substitution icon possesses main display information features of the source icon.

7 Claims, 5 Drawing Sheets

INFORMATION PROCESSING METHOD AND ELECTRONIC DEVICE

This application claims priority to Chinese patent application No. 201410608803.5 filed on Nov. 3, 2014, the entire contents of which are incorporated herein by reference.

The disclosure relates to the technical field of the information processing, and especially relates to an information processing method and an electronic device.

BACKGROUND

As the continuous development of the electronic technology, more and more electronic devices, such as smart phones, tablet PCs, notebook computers, come into people's work and life. The demand for installing applications on these electronic devices has become more and more common.

Generally, application icons are various with different shapes but without a uniform standard. In order to ensure aesthetics of the application icons on the display unit of the electronic device, a solution provided in the prior art is that substitution icons for the icons of all applications are pre-stored, and the substitution icons have fixed shapes, and when it is detected that an application is installed on the electronic device, the substitution icon for the application icon is displayed on the display unit of the electronic device.

In implementing the technical solutions of the embodiment of the present disclosure, the inventor found that there is a technical problem in the prior art as follows:

In the prior art, in order to ensure aesthetics of the application icons on the display unit of the electronic device, the substitution icons for all application icons have to be stored, thereby a large amount of the storage space of the electronic device is occupied.

SUMMARY

In one aspect, the embodiment of the present disclosure provides an information processing method, applied to an electronic device with a display unit, the information processing method includes:

obtaining parameter value of a pixel of a source icon on the display unit;

analyzing an energy distribution of the source icon based on the parameter value, and determining a core area of the source icon;

extracting the core area and conducting image processing for the core area to generate a substitution icon of the source icon for displaying, the substitution icon possesses main display information features of the source icon.

Alternatively, obtaining the parameter value of the pixel of a source icon on the display unit includes: conducting an edge detection processing to the pixel of the source icon and obtaining an edge intensity value of the pixel, the edge intensity value of the pixel is corresponding to content information of the pixel.

Analyzing the energy distribution of the source icon based on the parameter value and determining a core area of the source icon includes:

extracting a target pixel from pixels of the source icon, the target pixel is a pixel with edge intensity value at a preset value; and determining the core area which is an area containing the target pixel in the source icon.

Alternatively, before conducting an edge detection processing to the pixel of the source icon, the method further includes:

conducting compressing, and/or grayscale processing and/or filter smoothing processing to the source icon.

Alternatively, obtaining a parameter value of a pixel of a source icon on the display unit includes: obtaining a density value of the pixel in the source icon.

Analyzing an energy distribution of the source icon based on the parameter value and determining a core area of the source icon includes:

dividing the source icon into at least one pixel stream, the at least one pixel stream including pixels in same row or same column;

determining a density value of a pixel stream among the at least one pixel stream, the density value of the pixel stream corresponding to an amount of pixels with density value greater than a first preset threshold in the pixel stream;

extracting a target pixel stream which is a pixel stream with density value greater than a second threshold in the at least one pixel stream;

determining the core area which is an area containing the target pixel stream in the source icon.

Alternatively, extracting the core area and conducting image processing to the core area to generate a substitution icon of the source icon includes:

conducting a radial-based interpolation with an edge pixel of the core area as a first layer control point, and determining a color value of a filling pixel;

filling the core area with the filling pixel to generate the substitution icon.

Alternatively, conducting the radial-based interpolation includes: conducting the radial-based interpolation with the edge pixel of the core area as the first layer control point as well as an edge pixel of the source icon as a second control point.

In one aspect, the embodiment of the present disclosure provides an electronic device which includes:

a display unit;

an obtaining unit for obtaining a parameter value of a pixel of a source icon on the display unit;

a determining unit for analyzing an energy distribution of the source icon based on the parameter value and determining a core area of the source icon;

a generating unit for extracting the core area and conducting image processing to the core area to generate a substitution icon of the source icon for displaying, wherein the substitution icon possesses main display information features of the source icon.

Alternatively, the obtaining unit is configured to:

conduct an edge detection process to the pixel of the source icon and obtain an edge intensity value of the pixel, the edge intensity value of the pixel corresponds to content information of the pixel;

the determining unit is configured to:

extract a target pixel from pixels of the source icon, the target pixel is a pixel with edge intensity value at a preset value;

determine the core area which is an area containing the target pixel in the source icon.

Alternatively, the electronic device further includes a processing unit configured to conduct compressing, and/or grayscale processing and/or filter smoothing processing to the source icon before conducting an edge detection processing to the pixel of the source icon.

Alternatively, the obtaining unit is further configured to obtain a density value of the pixel in the source icon. The determining unit is further configured to:

divide the source icon into at least one pixel stream, the at least one pixel stream includes pixels in same row or same column;

determine a density value of a pixel stream among the at least one pixel stream, the density value of the pixel stream corresponding to an amount of pixels with density value greater than a first preset threshold;

extract a target pixel stream which is a pixel stream with density value greater than a second threshold in the at least one pixel stream;

determine the core area which is an area containing the target pixel stream in the source icon.

Alternatively, the generating unit includes:

a calculating subunit configured to conduct a radial-based interpolation with an edge pixel of the core area as a first layer control point, and determine a color value of a filling pixel;

a generating subunit configured to fill the filling pixel into the core area to generate the substitution icon.

Alternatively, the calculating subunit is configured to conduct the radial-based interpolation with the edge pixel of the core area as the first layer control point as well as an edge pixel of the source icon as a second control point, and determine the color value of the filling pixel.

In one aspect, the embodiments of the present disclosure provides a non-volatile storage medium recorded with a program executable by a computer, the program includes: obtaining a parameter value of a pixel of a source icon on the display unit; analyzing an energy distribution of the source icon based on the parameter value, and determining a core area of the source icon; extracting the core area and conducting image processing of the core area to generate a substitution icon of the source icon for displaying, the substitution icon possesses main display information features of the source icon.

BRIEF DESCRIPTION OF THE DRAWINGS

In order to describe the technical solutions in the embodiment of the present disclosure or in the prior art more clearly, the accompanying drawings, which are needed to be used in the description of the embodiment or in the prior art, will be briefly instructed below. It is obvious that the accompanying drawings described below are some embodiments of the present disclosure, and in terms of those skilled in the art, based on these accompanying drawings, other accompanying drawings can be obtained without creative work.

DETAILED DESCRIPTION

The embodiment of the present disclosure provides an information processing method and an electronic device for solving the problem in the prior art that the substitution icons for all application icons have to be stored thereby the storage space of the electronic device being greatly occupied, and provides an method for generating a substitution icon based on an application icon to reduce the occupied storage space of the electronic device.

In the embodiment of the present disclosure, first, a parameter value of a pixel of the source icon on the display unit of the electronic device is obtained, and then, an energy distribution of the source icon is analyzed based on the parameter value and the core area of the source icon is determined, and at last, the core area is extracted and the image processing is performed to the core area and the substitution icon for the source icon is generated to substitute and display the source icon, wherein, the substitution icon has the main display information features of the source icon.

A method of generating the substitution icon based on the source icon is provided and there is no need to store the substitution icons for all application icons, thereby reducing the occupied storage space of the electronic device.

In order to make objects, technical solutions and advantages of the embodiment of the present disclosure more clear, the technical solutions of the embodiment of the present disclosure will be clearly and completely described hereinafter in combination with the accompanying drawings in the embodiment of the present disclosure. It is obvious that the embodiments described are embodiments of present disclosure but the present disclosure does not limited to the embodiments described herein. Based on the embodiments of the present disclosure, all of other embodiments obtained without creative work by those skilled in the art belong to the protection scope of the present disclosure.

In addition, the term "and/or" used herein only refers to an corresponding relationship for describing related objects, indicating that there may be three kinds of relationship. For example, A and/or B may indicate the following three cases: only A, both A and B, only B. Moreover, the character "/" used herein generally indicates a "or" relationship between related objects before and after "/".

Hereinafter, the embodiment of the present disclosure will be described in details with reference to the accompanying drawings.

The present embodiment provides an information processing method, applied to an electronic device with a display unit. The electronic device could be a smart phone, a tablet computer, a notebook computer, etc. The display unit could be a touch display, a liquid crystal display, a LED display, etc.

A source icon is displayed on the display unit of the electronic device. The source icon can be either an icon of an application installed on the electronic device, or default icon preset on the electronic device. Generally, the source icon varies, with different shapes, and the electronic device or a user can set the shape of the source icon in order to ensure aesthetics of the source icon on the display unit. Comparing the shape of the source icon with the set shape, if the shape of the source icon is different from the set shape, a substitution icon for the source icon needs to be generated according to the source icon, and the substitution icon conforms to the set shape and has main display information features of the source icon.

Figure 1:
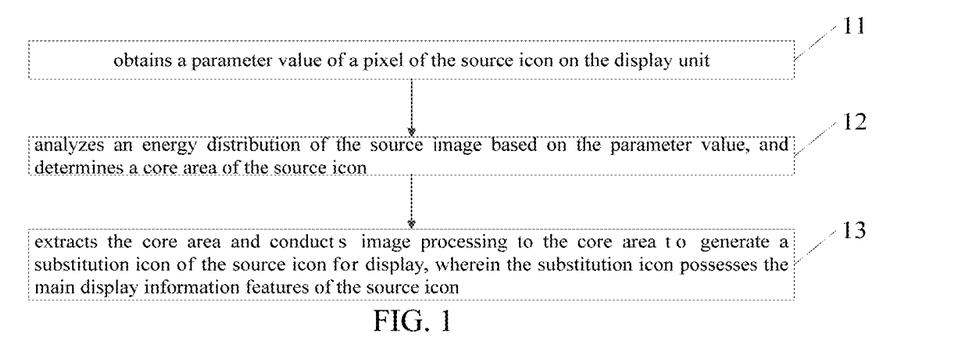
FIG. 1 is a flowchart of an information processing method provided by an embodiment of the present disclosure.

Refer to FIG. 1 for the specific method of generating the substitution icon for the source icon according to the source icon. FIG. 1 is a flowchart of the information processing method provided by the embodiment of the present disclosure. The method includes:

Step 11: obtains a parameter value of a pixel of the source icon on the display unit.

Step 12: analyzes an energy distribution of the source icon based on the parameter value, and determines a core area of the source icon;

Step 13: extracts the core area and conducting image processing to the core area and generates a substitution icon of the source icon for displaying, wherein the substitution icon possesses the main display information features of the source icon.

Wherein, Steps 11-12 are used to determine the core area of the source icon. Depending on the parameter value of the pixel of the source icon, the embodiment of the present disclosure provides two methods of determining the core area of the source icon.

Figure 2:
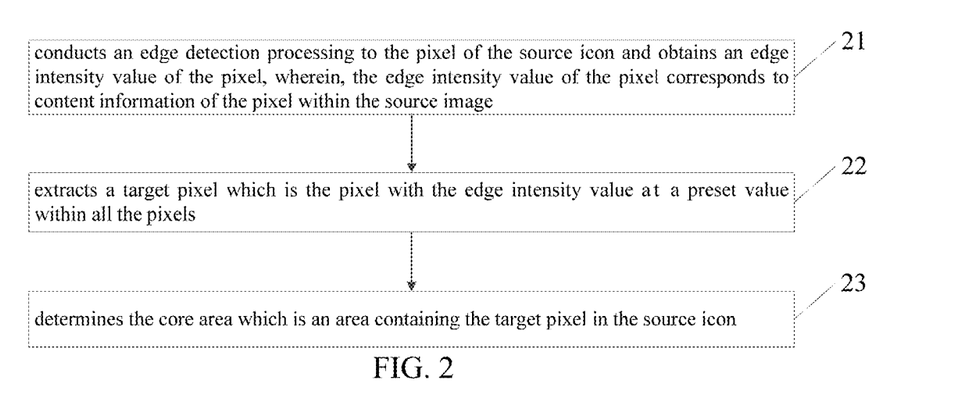
FIG. 2 is a flowchart of determining a core area of a source icon, which is provided by the embodiment of the present disclosure.

Refer to FIG. 2, FIG. 2 is a flowchart for determining the core area of the source icon, which is provided by the embodiment of the present disclosure.

Steps 21: conducts an edge detection processing to the pixel of the source icon and obtains an edge intensity value of the pixel, wherein, the edge intensity value of the pixel corresponds to content information of the pixel within the source icon;

Step 22: extracts a target pixel which is the pixel with the edge intensity value at a preset value within all the pixels;

Step 23: determines the core area which is an area containing the target pixel in the source icon.

Specifically, a part of pixels or all pixels on the source icon can be selected to conduct the edge detection processing according to different demands for image processing accuracy, and the more the pixels for conducting edge processing are selected, the higher the accuracy of extracting the core area is. In the embodiment of the present disclosure, the edge intensity value of respective pixels within the source icon are mainly obtained by filtering to source icon. Specifically, Laplace edge filter operator, Sobel edge filter operator, Robet edge operator, Prewitt edge operator, LOG edge operator or Canny filter operator, etc. can be used for filtering the source icon. After the process of edge detection, the edge intensity value of the pixel is (0, 0, 0) or (255, 255, 255). The edge intensity value of the pixel can reflect a distribution value of information of the source icon. An important structure information in the source icon can be determined through edge detection.

Figure 3A:
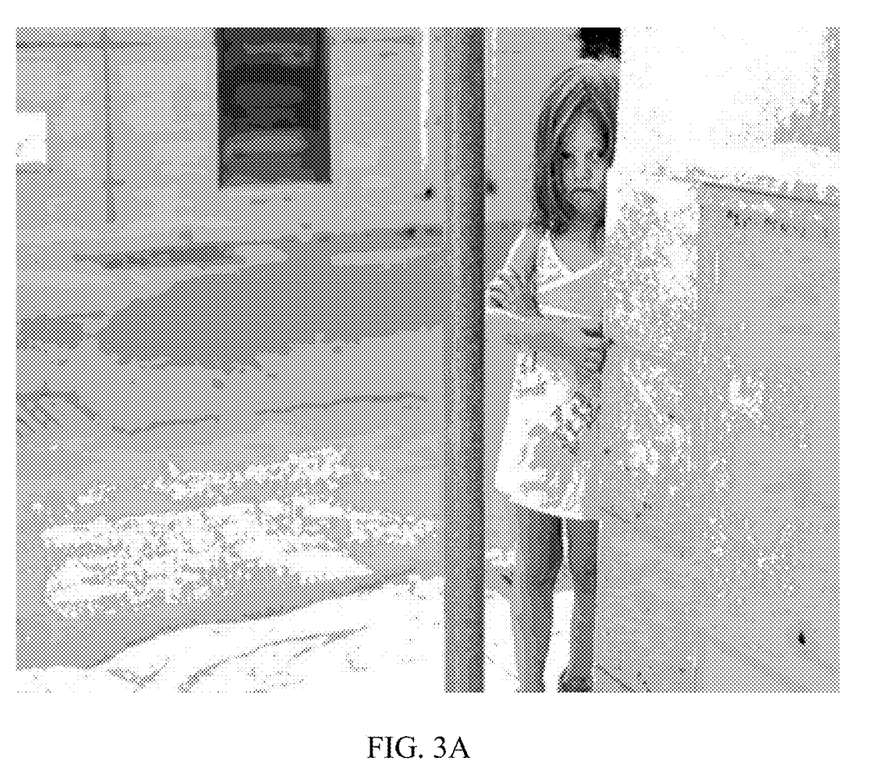
FIG. 3A is a schematic diagram of the source icon in the embodiment of the present disclosure.
Figure 3B:
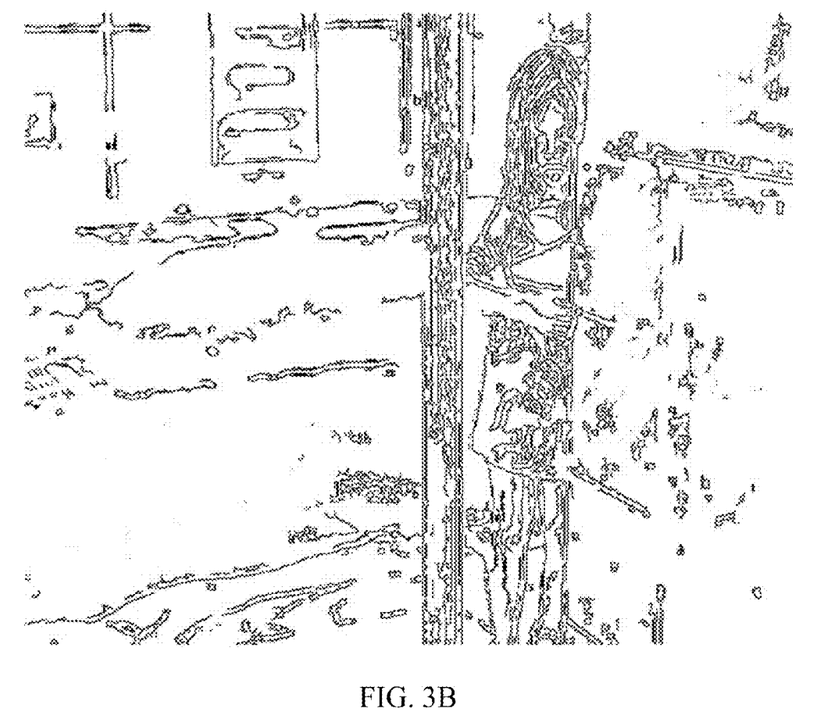
FIG. 3B is a schematic diagram of an image which is obtained after the source icon is edge detected in the embodiment of the present disclosure.

Refer to FIG. 3A and FIG. 3B. FIG. 3A is a schematic diagram of the source icon in the embodiment of the present disclosure, and FIG. 3B is a schematic diagram of the image which is obtained after the source icon is edge detected in the embodiment of the present disclosure. For example, when the source icon is a yellow triangle on a red background, the border between the triangle and the background, i.e. the outline of the triangle, can be obtained by edge detecting to the icon. Through edge detection, each pixel in the image has an edge intensity value corresponding to each pixel, which is generally white (0, 0, 0) or black (255, 255, 255). If the edge intensity values of two pixels are relatively close to each other, it can be considered that color difference between the two pixels is small; if difference between the edge intensity values of the two pixels are relatively large, it can be considered that the color difference between the two pixels is relatively large, that is, a border exists. Therefore, the edge intensity value can function as a parameter reflecting image content information.

Generally, the pixel with the edge intensity value of being black (255, 255, 255) can be set as an edge pixel, that is, (255, 255, 255) is a preset value. The edge intensity value of the pixel is compared with (255, 255, 255) in sequence and the pixel with the edge intensity value being (255, 255, 255) is extracted as the target pixel. Further, the core area is the area containing the target pixel.

In order to reduce the amount of calculation and improve the accuracy of the core area extraction, the following steps can be performed before the Step 21 is performed with respect to the source icon:

Conducts compressing and/or grayscale processing and/or filter smoothing processing to the source icon.

Specifically, compressing processing of the source icon can be achieved by the methods of down sampling, local meaning, etc. The grayscale processing of the source icon is: binarizing the source icon to obtain a grayscale image of the source icon. The filter smoothing processing of the source icon is conducted to the obtained grayscale image, and the filter smoothing processing can remove noise interference in the image, which improves signal to noise ratio of the image. Gaussian filter, median filter, etc. can be used as long as an denoising effect can be effectively achieved. Of course, those skilled in the art can select a suitable method based on specific demands to conduct compressing, grayscale processing and filter smoothing processing to the source icon, and the present disclosure does not set a restriction thereto.

Figure 4:
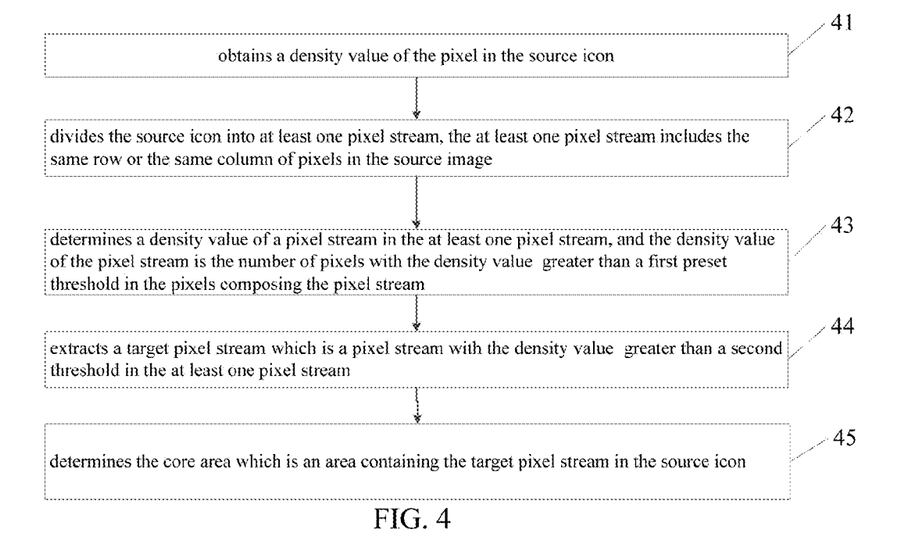
FIG. 4 is another flowchart for determining the core area of the source icon provided by the embodiment of the present disclosure.

Refer to FIG. 4. FIG. 4 is another flowchart for determining the core area of the source icon, which is provided by the embodiment of the present disclosure. The method includes:

Step 41: obtains a density value of the pixel in the source icon;

Step 42: divides the source icon into at least one pixel stream, the at least one pixel stream includes pixels in same row or same column;

Step 43: determines a density value of a pixel stream in the at least one pixel stream, and the density value of the pixel stream is the number of pixels with the density value greater than a first preset threshold in the pixels composing the pixel stream;

Step 44: extracts a target pixel stream which is a pixel stream with the density value greater than a second threshold in the at least one pixel stream;

Step 45: determines the core area which is an area containing the target pixel stream in the source icon.

Specifically, the density value of a part of pixels or all pixels on the source icon can be obtained according to different demands for image processing accuracy, and the more the pixels for calculating the density value, the higher the accuracy of extracting the core area is. The density value of the pixel can be any value between 0 and 255. In the embodiment of the present disclosure, the density value of the pixel can be obtained through a plurality of algorithms, such as gradient calculation, entropy, etc. Of course, those skilled in the art can obtain the density value of the pixel by using other methods, and the present disclosure does not set a restriction thereto.

Figure 5A:
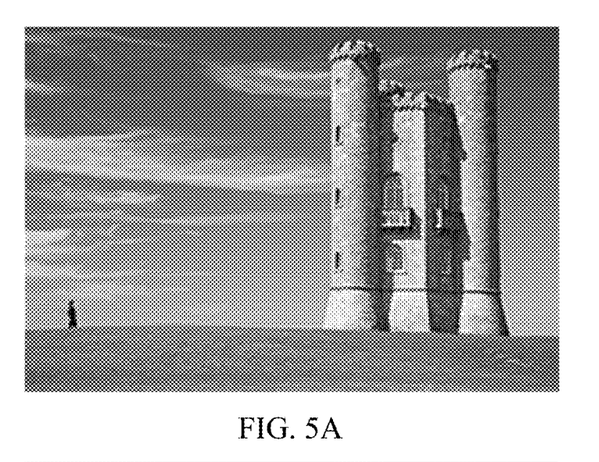
FIG. 5A is another schematic diagram of the source icon in the embodiment of the present disclosure.
Figure 5B:
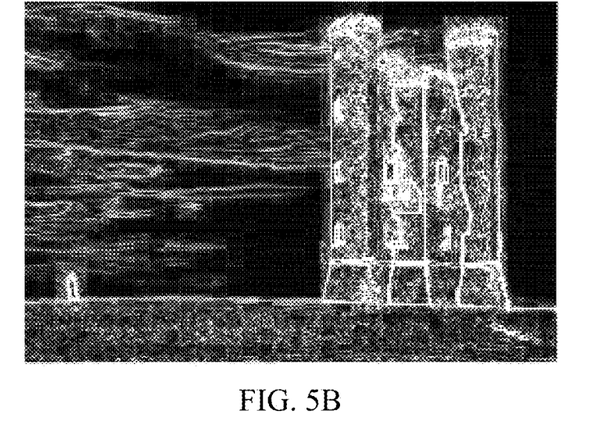
FIG. 5B is a schematic diagram of density value distribution of the source icon in the embodiment of the present disclosure.

Refer to FIG. 5A and FIG. 5B. FIG. 5A is another schematic diagram of the source icon in the embodiment of the present disclosure. FIG. 5B is a schematic diagram of density value distribution of the source icon in the embodiment of the present disclosure. FIG. 5B is the image which is obtained after the density value of the pixel in FIG. 5A is obtained. The density of image is the basis of controlling and evaluating the quality of color image and is a basic parameter for describing color and appearance of a object.

Figure 5C:
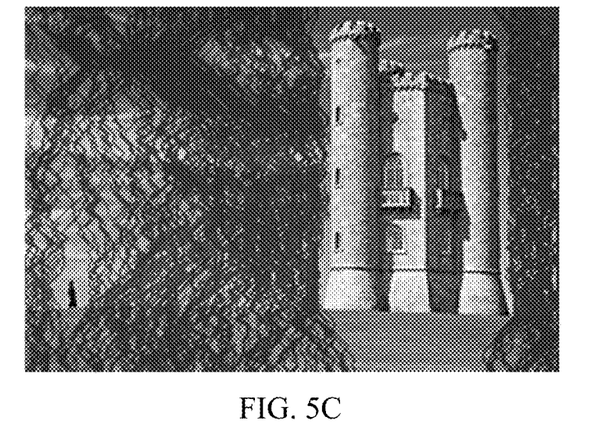
FIG. 5C is a schematic diagram of the high-energy pixel stream of the source icon in the embodiment of the present disclosure.

After the density value distribution of the source icon is obtained, a series of pixel streams, which refer to pixel rows with 1-pixel width in horizontal or vertical direction, can be generated. Refer to FIG. 5C. The solid line in FIG. 5C means the pixel streams. For each pixel stream, the density value of the pixel stream has to be calculated, that is, the number of the pixels with the density value greater than the first preset threshold in the pixels composing the pixel stream, wherein, the first preset threshold can be set according to the accuracy of image processing. Because the density value of the pixel is between 0 and 255, the first preset threshold can be set as a number between 0 and 255. For example, the first preset threshold is set as 150, and it is assumed that, in one pixel stream, there are 50 pixels with the density value greater than 150, the density value of the pixel stream is 50. In accordance with the same method, the density value of each pixel stream can be obtained.

Generally, the pixel stream with the density value greater than the second preset threshold is high-energy pixel stream and on the contrary, the pixel stream with the density value less than or equal to the second preset threshold, is low-energy pixel stream. The second preset threshold can be set according to the size of the density value distribution diagram of the source icon. It is assumed that the size of the density value distribution diagram of the source icon is M pixels multiplied by N pixels, if the current pixel stream is the pixel row with 1-pixel width in horizontal direction, the second preset threshold can be set as a number between 0 and M, and if the current pixel stream is the pixel row with 1-pixel width in vertical direction, the second preset threshold can be set as a number between 0 and N.

For example, the size of the schematic diagram of the density value distribution of the source icon illustrated by FIG. 5B is 255 pixels multiplied by 255 pixels. The pixel stream is the pixel row with 1-pixel width in vertical direction. The second preset threshold is 150 and if a density value of a pixel stream is 50, the pixel stream is the low-energy pixel stream, and if a density value of a pixel stream is 200, the pixel stream is the high-energy pixel stream.

Because the low-energy pixel stream represents a non-core area of the source icon and the high-energy pixel stream represents the core area of the source icon, the high-energy pixel stream can be extracted and further the core area is the area containing the high-energy pixel stream. Refer to FIG. 5C. FIG. 5C is a schematic diagram of the high-energy pixel stream of the source icon in the embodiment of the present disclosure. The solid line in FIG. 5C is the high-energy pixel stream, and the area covered by the solid line in FIG. 5C is the core area of the source icon.

It should be noted that two methods, which are provided by the embodiment of the present disclosure, used for determining the core area of the source icon are mentioned above, however the present disclosure is not limited thereto, and those skilled in the art can select other methods of determining the core area of the image as needed.

Figure 6:
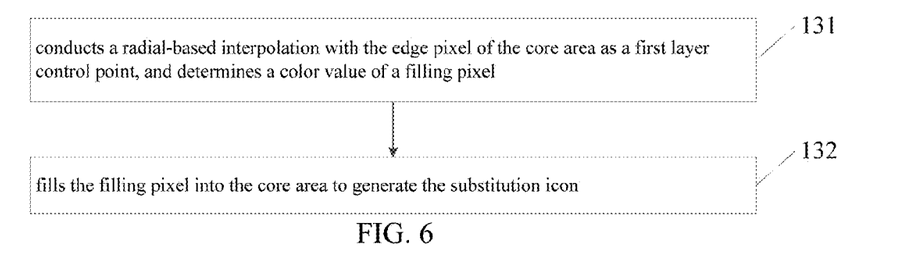
FIG. 6 is a detailed flowchart of Step 13 in the embodiment of the present disclosure.

After Steps 11-12 for determining the core area of the source icon are performed, step 13 can be performed. In the embodiment of the present disclosure, refer to FIG. 6 which is a detailed flowchart of Step 13 in the embodiment of the present disclosure, the step 13 specifically includes the following steps:

Step 131: conducts a radial-based interpolation with the edge pixel of the core area as a first layer control point, and determines a color value of a filling pixel;

Step 132: fills the filling pixel into the core area to generate the substitution icon.

Specifically, a radial-based function is used in the image processing. The radial-based interpolation is a method derived from the radial-based function. There is a control point in the radial-based function, and the closer the control point is away from the target point, the greater the impact factor is, and on the contrary, the further the control point is away from the target point, the less the influence is. The key of the radial-based interpolation algorithm is the radial-based function. The radial-based function is a real-valued function in which a value only depends on a distance from a original point, that is, $\phi(x)=\phi(\|x\|)$, or in which a value depends on a distance from any point c which is referred to as a central point, that is, $\phi(x, c)=\phi(\|x-c\|)$.

After determining the core area of the source icon, the core area can be trimmed and extracted, and the edge pixel of the image obtained by trimming and extracting is considered as the first layer control point and the radial-base interpolation is conducted, and the color value of the filling pixel is determined.

Because the shape of the source icon is different from the set shape, after extracting the core area of the source icon, some pixels needs to be filled into the periphery of the core area in order to generate the substitution icon conforming to the set shape, and further the substitution icon is generated. Because the pixel is filled on the basis of the core area of the source icon, the substitution icon has the main display information features of the source icon.

A specific filling method is: with the edge pixel of the core area as the first layer control point, determines the distance between the first layer control point and the filling pixel. It is assumed that there are N the first layer control points and the distance between N pixels and the filling pixel are separately $\phi_1, \phi_2 \ldots \phi^n$, and the color value of N pixels are separately $w_1, w_2 \ldots w_n$, the color value of the filling pixel $w=w_1\phi_1+w_2\phi_2+ \ldots +w_n\phi_n$. With respect to each filling pixel, the color value of the filling pixel can be calculated according to the same method. The radial-based interpolation can ensure that the color of the filled pixel is gradually changed and conforms to the color distribution feature of the source icon. At last, the filling pixel is filled into the core area to generate the substitution icon for the source icon.

In order to render better color transition, a transition area with 5-10 pixels should be reserved when the core area of the source icon is trimmed and extracted. Specifically, those pixels out of the core area, which are 5-10 pixels away from the edge of the core area, are considered as the first layer control points.

In order to calculate the color value of the filling pixel with more accuracy, the color value of the filled core area can be calculated in accordance with the same method as above-mentioned with the edge pixel of the core area being the first layer control point as well as the edge pixel of the image of the source icon being the second layer control point.

In the same way, in order to render better color transition, a transition area with 5-10 pixels should also be reserved when the edge pixel of the image of the source icon is extracted. Specifically, those pixels in the image of the source icon, which are 5-10 pixels away from the edge of the image, are considered as the second layer control points.

Figure 7A:
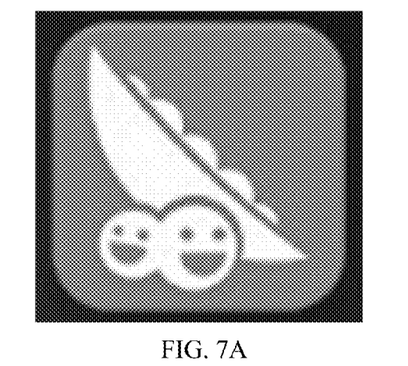
FIG. 7A is still another schematic diagram of the source icon in the embodiment of the present disclosure.
Figure 7B:
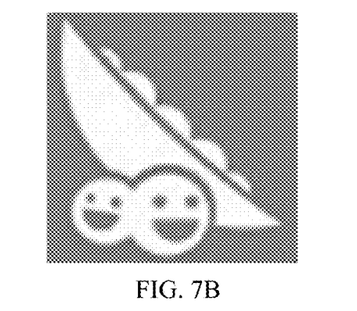
FIG. 7B is a schematic diagram of the core area of the source icon in the embodiment of the present disclosure.

Refer to FIG. 7A. FIG. 7A is another schematic diagram of the source icon in the embodiment of the present disclosure. FIG. 7B is a schematic diagram of the core area of the source icon in the embodiment of the present disclosure, and FIG. 7B is the core area determined and extracted after Step 11-Step 12 from FIG. 7A. The first layer control points in the embodiment of the present disclosure are the pixels on the edge of FIG. 7B, and the second layer control points in the embodiment of the present disclosure are the pixels on the edge of the white image and the black background in FIG. 7B.

Figure 8:
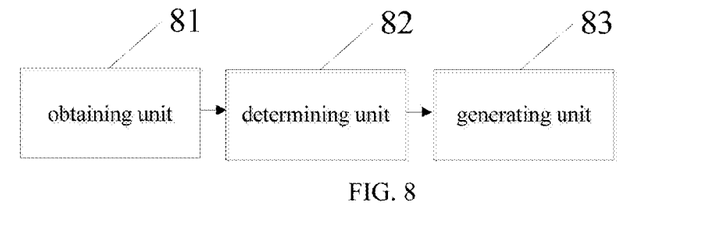
FIG. 8 is a schematic diagram of an electronic device in the embodiment of the present disclosure.

Based on the same inventive concept, the embodiment of the present disclosure further provides an electronic device with a display unit. Refer to FIG. 8. The electronic device further comprises:

a obtaining unit 81 configured to obtain a parameter value of a pixel of a source icon on the display unit;

a determining unit 82 configured to analyze an energy distribution of the source icon based on the parameter value and determine a core area of the source icon;

a generating unit 83 configured to extract the core area and conduct image processing to the core area, to generate a substitution icon of the source icon for display, wherein the substitution icon possesses main display information features of the source icon.

Alternatively, the obtaining unit 81 is configured to:

conduct an edge detection processing to the pixel of the source icon and obtaining an edge intensity value of the pixel, wherein, the edge intensity value of the pixel corresponds to content information of the pixel within the source icon;

The determining unit 82 is configured to:

extract a target pixel which is a pixel with the edge intensity value at a preset value within all the pixels;

determine the core area that is the area containing the target pixel in the source icon.

Alternatively, the electronic device further comprises:

a processing unit configured to conduct compressing and/or grayscale processing and/or filter smoothing processing to the source icon before conducting an edge detection processing to the pixel of the source icon.

Alternatively, the obtaining unit 81 is further configured to:

obtain a density value of the pixel in the source icon;

The determining unit 82 is further configured to:

divide the source icon into at least one pixel stream, the at least one pixel stream includes pixels in same row or same column;

determine a density value of a pixel stream in the at least one pixel stream, and the density value of the pixel stream is the number of pixels with the density value greater than a first preset threshold in the pixels composing the pixel stream;

extract a target pixel stream which is a pixel stream with the density value greater than a second threshold in the at least one pixel stream;

determine the core area which is an area containing the target pixel stream in the source icon.

Alternatively, the generating unit 83 comprises:

a calculating subunit configured to conduct a radial-based interpolation with an edge pixel of the core area as a first layer control point, and determine a color value of a filling pixel;

a generating subunit configured to fill the filling pixel into the core area to generate the substitution icon.

Alternatively, the calculating subunit is configured to:

conduct a radial-based interpolation with the edge pixel of the core area as the first layer control point as well as an edge pixel of the image in the source icon as the second control point, and determine the color value of the filling pixel.

Through one or more technical solutions in the embodiment of the present disclosure, one or more technical effects can be achieved as follows:

In the embodiment of the present disclosure, first, the parameter value of the pixel of the source icon on the display unit of the electronic device is obtained, and then, the energy distribution of the source icon is analyzed based on the parameter and the core area of the source icon is determined, and at last, the core area is extracted and the image processing is performed to the core area and the substitution icon for the source icon is generated to substitute and display the source icon, wherein, the substitution icon has the main display information features of the source icon.

A method of generating the substitution icon based on the source icon is provided, and the substitution icon for the source icon is generated in real time according to the source icon and there is no need to store the substitution icons for all application icons, thereby reducing the occupied storage space of the electronic device.

It should be appreciated for those skilled in the art that the embodiment of the present disclosure can be provided as a method, a system, or a computer program product. Therefore, the present disclosure can be implemented in the form of an entire hardware embodiment, an entire software embodiment or an embodiment combining hardware and software aspects. Furthermore, the present disclosure can be implemented in the form of one or more computer program products implemented on a computer useable storage medium (including, but not limited to disc storage, CD-ROM, optical storage, etc.) which comprises a computer usable program code.

The present disclosure is described with reference to the flowcharts and/or block diagrams according to the method, the device (system) and the computer program product of the embodiment of the present disclosure. It should be appreciated that each process and/or each block in the flowcharts and/or the block diagrams as well as a combination of the processes and/or the blocks in the flowcharts and/or block diagrams can be implemented by computer program commands. These computer program commands can be provided for a general-purpose computer, a dedicated computer, an embedded processor, or the processors of other programmable data processing devices to produce a machine, so that an apparatus, which is used for implementing the function specified by one process or a plurality of processes in the flowcharts and/or one block or a plurality of blocks in the block diagrams, is produced through the commands executed by the computers or the processors of other programmable data processing devices.

These computer program commands can also be stored in a computer-readable memory, which can direct the computers and the other programmable data processing devices to function in a particular manner, so that the commands stored in the computer-readable memory generates an article of manufacture including a command apparatus which implements the function specified by one process or a plurality of processes in the flowcharts and/or one block or a plurality of blocks in the block diagrams.

The computer program commands can also be loaded on the computers or the other programmable data processing devices, so that a series of operation procedures are implemented on the computers or the other programmable devices to generate a computer-implemented processing, and thus the commands executed on the computers or the other programmable devices provide the procedures for implementing the function specified by one process or a plurality of processes in the flowcharts and/or one block or a plurality of blocks in the block diagrams.

Specifically, the computer program command corresponding to an information processing method of the embodiment of the present disclosure can be stored on the storage medium such as optical disk, hard disk, USB drive, etc. When the computer program command corresponding to the information processing method in the storage medium is read or executed by an electronic device, the following steps are included:

obtaining a parameter value of a pixel of a source icon on the display unit;

analyzing an energy distribution of the source icon based on the parameter value and determining a core area of the source icon;

extracting the core area and conducting image processing to the core area, and generating the substitution icon for the source icon to substitute and display the source icon, wherein the substitution icon possesses main display information features of the source icon.

Alternatively, when specifically executed, the computer command stored in the storage medium and corresponding to the step: obtaining a parameter value of a pixel of a source icon on the display unit is, as follows:

conducting an edge detection processing to the pixel of the source icon and obtaining an edge intensity value of the pixel, wherein, the edge intensity value of the pixel corresponds to information quantity of the pixel within the source icon;

The step of analyzing an energy distribution of the source icon based on the parameter value and determining a core area of the source icon is as follows:

extracting a target pixel which is an pixel with the edge intensity value at a preset value within all the pixels;

determining the core area which is an area containing the target pixel in the source icon.

Alternatively, there are also some other computer commands stored in the storage medium, and these computer commands are executed before the computer commands corresponding to the step: conducting an edge detection processing to the pixel of the source icon are executed, and the following steps are included when these computer commands are executed:

conducting compressing and/or grayscale processing and/or filter smoothing processing to the source icon.

Alternatively, when specifically executed, the computer command stored in the storage medium and corresponding to the step: obtaining a parameter value of a pixel of a source icon on the display unit is as follows:

obtaining a density value of the pixels in the source icon;

The step of analyzing an energy distribution of the source icon based on the parameter value and determining a core area of the source icon is as follows:

dividing the source icon into at least one pixel stream, the at least one pixel stream includes pixels in same row or same column;

determining a density value of a pixel stream in the at least one pixel stream, and the density value of the pixel stream is the number of pixels with the density value greater than a first preset threshold in the pixels composing the pixel stream;

extracting a target pixel stream which is a pixel stream with the density value greater than a second threshold in the at least one pixel stream;

determining the core area which is an area containing the target pixel in the source icon.

Alternatively, when specifically executed, the computer command stored in the storage medium and corresponding to the step: extracting the core area and conducting image processing to the core area, and generating a substitution icon for the source icon is as follows:

conducting a radial-based interpolation with an edge pixel of the core area as a first layer control point, and determining a color value of a filling pixel;

filling the filling pixel into the core area to generate the substitution icon.

Alternatively, when specifically executed, the computer command stored in the storage medium and corresponding to the step: conducting a radial-based interpolation with the edge pixel of the core area as a first layer control point, and determining a color value of a filling pixel is as follows:

conducting a radial-based interpolation with the edge pixel of the core area as the first layer control point and the edge pixel of the image in the source icon as a second control point, and determining the color value of the filling pixel.

Although the preferred embodiments of the present disclosure has been described, once those skilled in the art are informed of the basic inventive concept, they can make additional alternations and modifications to these embodiments. Therefore, the appended claims are intended to be expounded to include the preferred embodiments and all of the alternations and modifications falling within the scope of the present disclosure.

It is obvious that those skilled in the art can make various alternations and modifications without departing from the spirit and scope of the present application. Thus, if these alternations and modifications of the present application belong to the scopes of the claims of the present application and its equivalent technology, the present application is intended to include these alternations and modifications.

The invention claimed is:

1. An information processing method applied to an electronic device with a display unit comprising:
   obtaining a parameter value of a pixel of a source icon on the display unit, which comprises obtaining a density value of the pixel in the source icon;
   analyzing an energy distribution of the source icon based on the parameter value, and determining a core area of the source icon, which comprises:
   dividing the source icon into at least one pixel stream, the at least one pixel stream including pixels in a same column or same row;
   determining a density value of a pixel stream among the at least one pixel stream, the density value of the pixel stream corresponding to an amount of pixels with a density value greater than a first pre-set threshold;
   extracting a target pixel stream which is a pixel stream with a density value greater than a second threshold in the at least one pixel stream; and
   determining the core area which is an area containing the target pixel stream in the source icon; and extracting the core area and conducting image processing to the core area to generate a substitution icon of the source icon for displaying, wherein the substitution icon possesses main display information features of the source icon.

2. The information processing method of claim 1, wherein the extracting the core area and conducting image processing of the core area to generate a substitution icon of the source icon for displaying comprises:
   conducting a radial-based interpolation with an edge pixel of the core area as a first layer control point, and determining a color value of a filling pixel; and
   filling the core area with the filling pixel to generate the substitution icon.

3. The information processing method of claim 2, wherein the conducting a radial-based interpolation with an edge pixel of the core area as a first layer control point comprises conducting the radial-based interpolation with the edge pixel of the core area as the first layer control point as well as an edge pixel of the source icon as a second control point.

4. An electronic device, comprising:
   a display unit;
   an obtaining unit configured to obtain a parameter value of a pixel of a source icon on the display unit, wherein the obtaining unit further is configured to obtain a density value of the pixel in the source icon;
   a determining unit configured to analyze an energy distribution of the source icon based on the parameter value and determine a core area of the source icon, wherein the determining unit is further configured to
      divide the source icon into at least one pixel stream, the at least one pixel stream including pixels in a same row or same column;
      determine a density value of a pixel stream among the at least one pixel stream, the density value of the pixel stream corresponding to an amount of pixels with density value greater than a first preset threshold;
      extract a target pixel stream which is a pixel stream with density value greater than a second threshold in the at least one pixel stream; and
      determine the core area which is an area containing the target pixel stream in the source icon; and
   a generating unit configured to extract the core area and conduct image processing to the core area to generate a substitution icon of the source icon for displaying, wherein the substitution icon possesses main display information features of the source icon.

5. The electronic device of claim 4, wherein the generating unit comprises:
   a calculating subunit configured to conduct a radial-based interpolation with an edge pixel of the core area as a first layer control point, and determine a color value of a filling pixel; and
   a generating subunit configured to fill the core area with the filling pixel to generate the substitution icon.

6. The electronic device according to claim 5, wherein, the calculating subunit is further configured to conduct the radial-based interpolation with the edge pixel of the core area as the first layer control point as well as an edge pixel of the source icon as a second control point.

7. A non-transitory storage medium recorded with a program executable by a computer, the program comprising:
   obtaining a parameter value of a pixel of a source icon on the display unit, which comprises obtaining a density value of the pixel in the source icon;
   analyzing an energy distribution of the source icon based on the parameter value, and determining a core area of the source icon, which comprises:
      dividing the source icon into at least one pixel stream, the at least one pixel stream including pixels in a same column or same row;
      determining a density value of a pixel stream among the at least one pixel stream, the density value of the pixel stream corresponding to an amount of pixels with a density value greater than a first pre-set threshold;
      extracting a target pixel stream which is a pixel stream with a density value greater than a second threshold in the at least one pixel stream; and
      determining the core area which is an area containing the target pixel stream in the source icon; and
   extracting the core area and conducting image processing of the core area to generate a substitution icon of the source icon for displaying, wherein the substitution icon possesses main display information features of the source icon.

* * * * *